J. W. MILLER & B. COLL.
Soldering-Machines.

No. 213,438.  Patented Mar. 18, 1879.

WITNESSES:
Henry N. Miller
C. Sedgwick

INVENTOR:
J. W. Miller
B. Coll
BY Munn & Co
ATTORNEYS.

UNITED STATES PATENT OFFICE.

JOSEPH W. MILLER AND BERNARD COLL, OF BALTIMORE, MARYLAND.

IMPROVEMENT IN SOLDERING-MACHINES.

Specification forming part of Letters Patent No. 213,438, dated March 18, 1879; application filed December 3, 1878.

*To all whom it may concern:*

Figure 1:
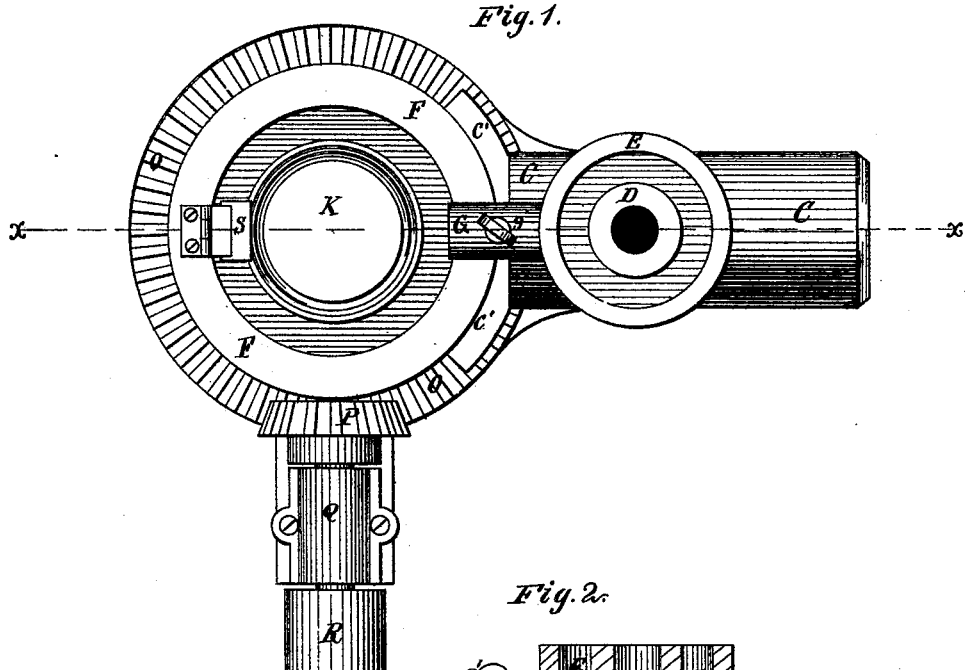
Figure 2:
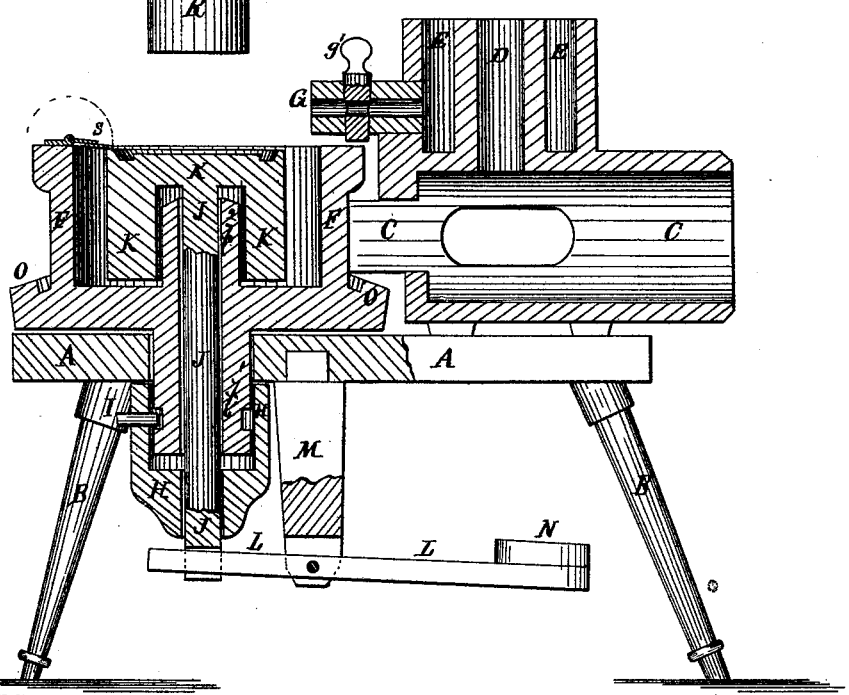

Be it known that we, JOSEPH W. MILLER and BERNARD COLL, of Baltimore, in the county of Baltimore and State of Maryland, have invented a new and useful Improvement in Soldering-Machines, of which the following is a specification:

Figure 1 is a top view of our improved soldering-machine. Fig. 2 is a vertical section of the same, taken through the line $x$ $x$, Fig. 1.

Similar letters of reference indicate corresponding parts.

The object of this invention is to furnish an improved machine for soldering top and bottom cans, pails, &c., which shall be simple in construction, convenient in use, and reliable in operation, doing the work rapidly and well.

The invention consists in an improved soldering-machine formed by the combination of the furnace provided with the vessel around its pipe, the spout and stop-cock, and the curved plate or flange, the rotating vessel provided with the perforated projections, the die provided with the stem, the weighted or spring lever, the iron, and the gear-wheels and pulley with each other, as hereinafter fully described.

A is the bed-plate or table of the machine, which is supported upon legs B, of such a length as to raise the machine to a convenient height. To the rear end of the table A is attached the furnace C, with the top of which is connected a pipe, D, through which the products of combustion escape, and which is surrounded with a cylindrical cup or vessel, E, forming a ring-shaped cavity to receive the solder to be melted.

The inner end of the furnace C rests against the convex side of the hollow cylinder F, and has a curved plate, $c'$, formed upon it, which projects along the side of the said cylinder, as shown in Fig. 1.

From the cup E projects a pipe or spout, G, through which the melted solder escapes, and which is provided with a stop-cock, $g'$, to enable the escape of the solder to be regulated, as desired.

The vessel F rests upon the table A, and has a cylindrical projection, $f^1$, formed upon the center of the lower side of its bottom, which passes through a hole in the bed-plate or table A, so as to pivot the said vessel to the said table. The vessel F is kept down upon the table A by a collar, H, placed upon it, which rests against the under side of the said table A, and has a hole or holes formed through it to receive a pin or pins, I, to enter a ring-groove in the said projection $f^1$.

Upon the upper side of the center of the bottom of the vessel F is formed a cylindrical projection, $f^2$, of such a height as to prevent the melted solder from escaping from the said vessel F. Through the projection $f^2$, the bottom of the vessel F, and the projection $f^1$ is formed a hole, through which is passed the stem J of the die or holder K. In the base of the holder or die K, around the stem J, is formed a ring-cavity to receive the projection $f^2$, as shown in Fig. 2. The top of the die or holder K is so formed as to fit upon the end of the vessel to be soldered, and the lower end of the stem J is notched or slotted to receive the lever L. The lever L is pivoted to the lower end of a support, M, which is attached to the under side of the table A. The other end of the lever L is held down by a weight, N, or a spring to hold the die K, and the vessel placed upon it above the solder in the vessel.

Around the base of the vessel F is formed a bevel-gear wheel, O, into the teeth of which mesh the teeth of the bevel-gear wheel P, the journal of which revolves in a bearing, Q, attached to the side of the table A.

To the outer end of the journal of the gear-wheel P is attached a pulley, R, to receive a driving-belt from any convenient power.

To the upper edge of the vessel F is hinged an iron, S, which rests upon the seam to be soldered, spreads the solder, and also acts as a guide to indicate that the seam has been soldered all around.

The operation is as follows: A sufficient quantity of melted solder being admitted to the vessel F to cover the die when depressed, and the said vessel F being caused to revolve by any suitable power, the end of the can to be soldered is now placed on the die, and the die and can caused to dip into the melted solder by pressure, which being done, and the pressure being removed, the weight or spring causes the die to assume its original position, and the hinged iron on the revolving vessel spreads the solder over the seam, and indicates when the vessel has revolved once around the die, thereby showing that the entire seam has been soldered.

Having thus described our invention, we claim as new and desire to secure by Letters Patent—

An improved soldering-machine formed by the combination of the furnace C, provided with the vessel E around its pipe D, the spout and stop-cock G $g'$, and the curved plate or flange $c'$, the rotating vessel F, provided with the perforated projections $f^1 f^2$, the die K, provided with the stem J, the weighted or spring lever L, the iron S, and the gear-wheels and pulley O P R with each other, substantially as herein shown and described.

JOSEPH WALKER MILLER.
BERNARD × COLL.
his mark.

Witnesses:
PHILIP C. SANDERSON,
FRANCIS H. ABBES,
G. KOFFENBERGER.